May 6, 1958 D. F. BABCOCK 2,833,917

LOCKING-OSCILLATOR PHASE-PULSE GENERATOR

Filed Jan. 16, 1957 5 Sheets-Sheet 1

INVENTOR.
DEAN F. BABCOCK

BY Moody and Goldman

ATTORNEYS

May 6, 1958 D. F. BABCOCK 2,833,917

LOCKING-OSCILLATOR PHASE-PULSE GENERATOR

Filed Jan. 16, 1957 5 Sheets-Sheet 2

INVENTOR.
DEAN F. BABCOCK
BY Moody And Goldman
ATTORNEYS

INVENTOR.
DEAN F. BABCOCK
BY Moody and Goldman
ATTORNEYS

INVENTOR.
DEAN F. BABCOCK
BY Moody and Goldman
ATTORNEYS

INVENTOR.
Dean F. Babcock
BY Moody and Goldman
Attorneys

United States Patent Office 2,833,917

Patented May 6, 1958

2,833,917

LOCKING-OSCILLATOR PHASE-PULSE GENERATOR

Dean F. Babcock, Tarzana, Calif., assignor to Collins Radio Company, Cedar Rapids, Iowa, a corporation of Iowa Application January 16, 1957, Serial No. 634,559

6 Claims. (Cl. 250—8)

This invention relates generally to means for translating dual-channel binary information into phase variations of a carrier or subcarrier frequency, which, for example, may be used to transmit a teletypewriter signal or sampled bits of a continuously varying signal.

This invention utilizes a system of transmission taught in Patent No. 2,676,245 to Melvin L. Doelz titled "Polar Communication System" and issued April 20, 1954. Briefly, the system utilizes a predetermined phase change between adjacent tone pulses to recognize a mark or space of a binary code. Thus, the system detects a mark or space by a phase comparison of two adjacent pulses, wherein each pulse acts as a phase reference for its immediately following pulse. Therefore, the system does not require any absolute phase reference and, hence, is not appreciably susceptible to unpredictable phase shifts caused by unknown delays in the propagation of a radio signal.

Furthermore, such system is particularly adaptable for the transmission of two independent channels on a single frequency. This is done by providing one of four phase conditions for each new tone pulse with respect to the prior tone pulse; wherein optimum conditions require the signal components of one channel to be in quadrature phase with the signal components of the other channel.

A different means for transmitting information according to this communication system is described and claimed in patent application, Serial No. 502,045, of Melvin L. Doelz and Dean F. Babcock titled "High Speed Transmission of Printed Messages," filed April 18, 1955. It recirculates a tone between two magnetostrictive integrators with two dâta-signal controlled phase-shifters connected respectively between them. The phase-modulated output is taken from gates connected to the respective resonators.

The present invention provides a uniquely different means for generating tone pulses that are adjacently phase modulated.

It is an object of this invention to provide a phase-pulse tone generator which has a minimum transient condition between adjacent output pulses.

It is another object of this invention to provide a phase-pulse generator which obtains a higher order of phase accuracy of its output phase-pulses than prior generators.

It is also an object of this invention to provide a phase-pulse tone generator that does not require magnetostrictive components.

It is a further object of this invention to provide a phase-pulse tone generator that locks its component phases with respect to a standard frequency.

The invention uses a prime-frequency, which is eight times the output frequency of the invention. The prime frequency may be an audio frequency and preferably has a high order of stability, wherein it does not vary by more than a few degrees over the period of a data pulse.

The invention includes a pair of locking oscillators, each being capable of locking its output frequency to a received frequency to within approximately plus-or-minus 22½° phase-wise.

The locking oscillators are used respectively by a pair of phase-locking circuits that include respective automatic-phase-control circuits. Each automatic-phase-control circuit includes a ×8 frequency multiplier, phase detector, phase gate, and controlled reactance. The frequency multiplier multiplies the output of the locking oscillator by eight and provides it at one input to the phase detector. The phase detector receives the standard frequency as its other input. The phasing gate is normally-open to connect the output of the phase detector to the input of the controlled reactance. The controlled reactance is included in the tank circuit of the respective locking oscillator and, accordingly, adjusts its frequency to obtain a phase lock between its eighth harmonic frequency and the standard frequency.

Phase locking with respect to the eighth harmonic of the locking-oscillator frequency permits eight possible phase-locked conditions for the output of each locking oscillator with respect to the eighth submultiple of the standard frequency.

First and second output gates respectively connect to the outputs of the first and second phase-locking circuits. The outputs from the output gates are connected to a common terminal that provides the output of the invention.

However, the outputs of the output gates are also utilized internally in the invention to complete a tone-frequency recirculation path. A first phase-determining circuit receives the output of the first output gate, and a second phase-determining circuit receives the output of the second output gate. Each phase-determining circuit includes a pair of phase selectors that have their inputs connected in common to the output of the respective output gate. One phase selector in each determining circuit phase shifts its received frequency by either 0° or 180° in response to a mark or space, respectively, provided by a first data channel. The other phase selector in each determining circuit phase shifts its received tone frequency by either 90° or 270° in response to a mark or space, respectively, from the second channel. An adder circuit is included in each phase-determining circuit to add the instantaneous outputs of both of its phase selectors to provide the phased output of the respective determining circuit. Summing the possible outputs of the phase-selector circuits in either determining circuit determines an output phase of either 45°, 135°, 225° or 315° with respect to the circuit input.

The output of the first phase-determining circuit is provided as an input to the second locking oscillator; and the output of the second phase-determining circuit is provided as an input to the first locking oscillator. The automatic phase-control-circuit of each locking oscillator is disabled momentarily so that it can approximately lock with the received tone frequency. When the automatic-frequency-control circuit is enabled, it pulls the phase of the locking oscillator precisely into phase alignment by locking it to a selected ×8 cycle of the reference frequency.

The invention recirculates a tone while phase shifting it according to the data from the channels, wherein the phase of the previous tone is provided as the reference for the phase shift of a new tone, as required by the phase-pulse modulating system used by the invention. The two locking oscillators alternately provide the output phase-pulses.

Further objects, features and advantages of this invention will be apparent to a person skilled in the art upon further study of the specification and drawings, in which.

Figure 1:
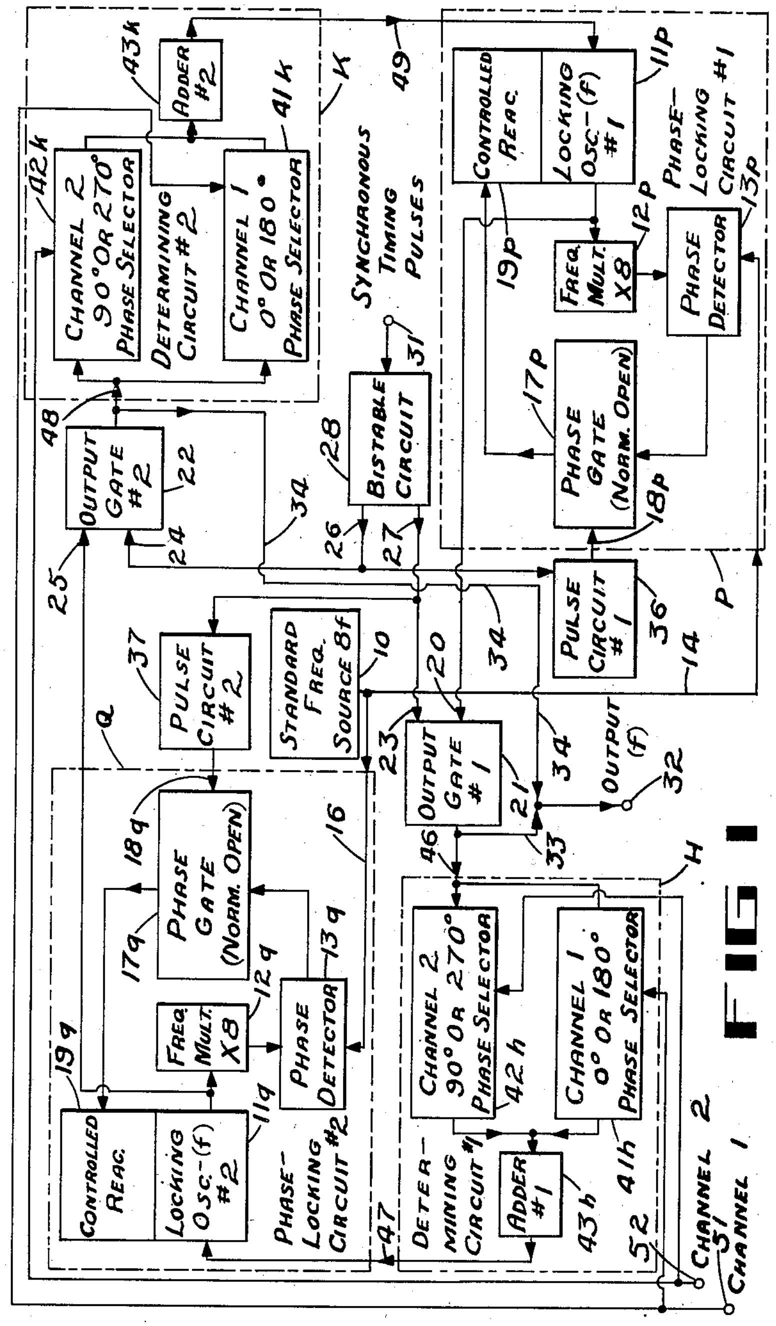
Figure 1 is a block diagram of the invention.

Now referring to the form of the invention illustrated in Figure 1, a standard-frequency source 10 provides a stable frequency that is eight times the frequency of the phase-modulated output of the invention provided at terminal 32.

A first phase-locking circuit P and a second phase-locking circuit Q each receives the frequency of standard source 10. Each phase-locking circuit is comprised of components which may be identical and which are given like reference numbers herein, but are distinguished by a suffix letter designation. A locking-oscillator 11 is included within each phase-locking circuit; and a frequency multiplier 12 is connected to the output of the locking-oscillator to multiply its frequency by eight. A phase detector 13 has its respective inputs connected to the multiplier output and the standard-frequency source. Thus, lead 14 connects standard source 10 to phase detector 13*p*; and lead 16 connects standard source 10 to the phase detector 13*q*.

A phase gate 17 has its input connected to the output of phase detector 13 and is normally open to permit the phase-detector output to pass through it. It is closed to block the phase-detector output only when it receives a pulse at its control input 18.

A controlled reactance 19 is included with the tank circuit of each locking oscillator 11 and is connected to the output of phase gate 17. Controlled reactance 19 may, for example, be a reactance tube or a saturable reactor of known type, wherein its inductance is controlled by varying the flux saturation of a ferrous core with the phase-detector output.

A first output gate 21 and a second output gate 22 have their controlled inputs 20 and 25 respectively connected to the outputs of first and second locking oscillators 11*p* and 11*q*. Output gates 21 and 22 have control inputs 23 and 24 respectively connected to opposite outputs 26 and 27 of a bistable circuit 28, which, for example, can be a conventional flip-flop circuit.

Figure 6:
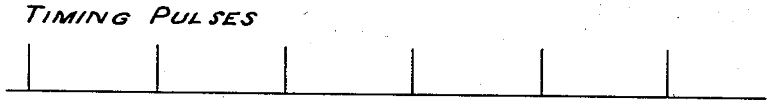
Figure 7:
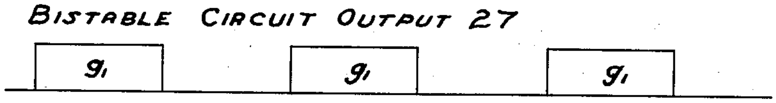
Figure 9:
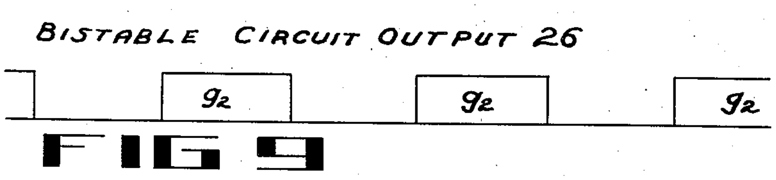

A source of timing pulses is connected to input terminal 31 of bistable circuit 28. The timing pulses are synchronous with the data inputs provided to the invention; wherein a timing pulse occurs upon the initiation of each input data pulse. Figure 6 illustrates a sequence of timing pulses; and Figures 7 and 9 illustrate the inverted outputs of bistable circuit 28.

Output terminal 32 provides the phase-pulsed output of the invention and is connected by leads 33 and 34 to the respective outputs of gates 21 and 22.

Figure 8:
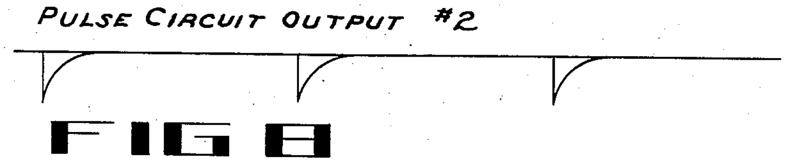
Figure 10:
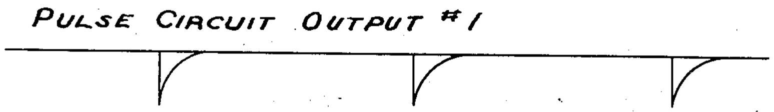

However, the inverted square-wave outputs of bistable circuit 28 are also used to time the operation of phase-locking circuits P and Q. This is done with the assistance of a pair of pulse-forming circuits 36 and 37. First pulse circuit 36 is connected between bistable circuit output 26 and the control input 18*p* of phase gate 17*p*. Second pulse circuit 37 is similarly connected between opposite bistable-circuit output 27 and control input 18*q* of phase gate 17*q*. Each pulse circuit forms one output pulse for each cycle received from bistable circuit 28 and, therefore, has one-half the repetition rate of the timing pulses. For example, the pulse circuits can be differentiating circuits which form negative pulses from the leading edges of the respective square-wave outputs of bistable circuit 28. Thus, Figure 8 illustrates such negative pulses formed by first pulse circuit 36 from the leading edges of bistable circuit output 27, shown in Figure 7. Likewise, Figure 10 illustrates the negative pulses formed by second pulse circuit 37 from the leading edges of inverted bistable circuit output 26, shown in Figure 9. Note that the negative pulses in Figures 8 and 10 alternate in time occurrence.

The phase gate in each phase-locking circuit is normally open to provide a connection between its phase-detector output and its controlled reactance 19 to permit automatic-phase-control action. However, pulse gate 17 is closed for the short duration of each received negative pulse to disable its automatic-phase-control circuit for its duration.

A first phase-determining circuit H and a second phase-determining circuit K are also required by the modulating process of the invention. The phase-determining circuits are oppositely inserted into the circuit and complete an internal recirculating path for the modulated frequency, which will become more apparent below. Thus, first determining circuit H has its tone input 46 connected to the output of first output gate 21. Circuit H has its tone output 47 connected to the input of second-locking oscillator 11*q*.

On the other hand, second phase-determining circuit K has its tone input 48 connected to the output of second output gate 22. Circuit K has its tone output 49 connected to the input of first-locking oscillator 11*p*.

Phase-determining circuits H and K alternately operate because their tone inputs are alternately provided, due to the alternate switching of output gates 21 and 22 by the opposite outputs of bistable circuit 28.

Each phase-determining circuit H or K is comprised of a pair of phase-selector circuits 41 and 42, which have their inputs connected in common to the tone input of their phase-determining circuit.

Figure 11:
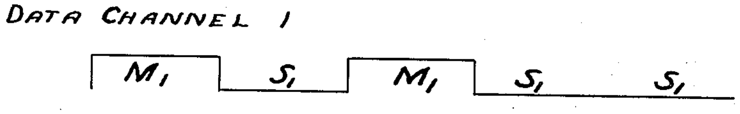
Figure 12:
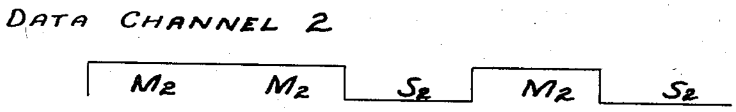

The data from a first channel is provided to input terminal 51 and the data from an independent second channel is provided to another input terminal 52. The binary data of each channel is presented in pulse form by switching between two direct-current voltage levels; wherein a mark can be represented by a positive pulse, and a space can be represented by a negativ pulse. Figures 11 and 12 illustrate independent pulse sequences for channels one and two, respectively.

The phase selectors receive the respective data inputs from the two data channels. Thus, phase selectors 41*h* and 41*k* have their control inputs connected to terminal 51 to receive channel one data; and phase selectors 42*h* and 42*k* have their control inputs connected to terminal 52 to receive channel two data.

Each channel-one phase selector 41*h* or 41*k* shifts the phase of its received tone frequency by either 0° or 180° in response to a data mark or space, respectively, received from channel one terminal 51.

In a similar manner, each channel-two phase selector 42*h* or 42*k* shifts the phase of its received tone frequency by either 90° or 270° in response to a data mark or space, respectively, received from channel two terminal 52.

Phase selector 41*h* or 41*k* may be any one of a number of different types of conventional circuits. For example, each can be a balanced modulator, such as balanced modulator 56 illustrated in Figure 2.

Figure 2:
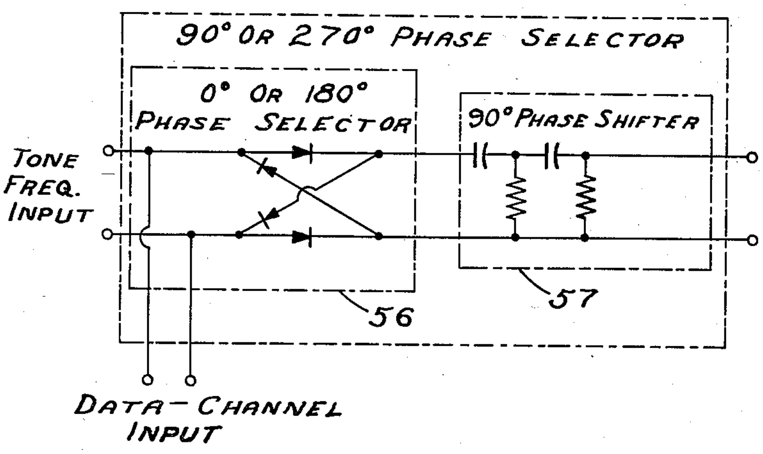
Figure 2 illustrates a conventional phase-selector circuit, which can be utilized as a component in the invention.

Channel-two phase selectors 42*h* and 42*k* can each be made as shown in Figure 2 with 0° or 180° phase-selector circuit 56 and a 90° phase-shift circuit 57 connected to the output of circuit 56. Such a 90° phase-shift circuit can be made from two resistor-capacitor phase-shift circuits connected in tandem, each providing 45° of phase shift.

Also, an adder circuit 43 is connected in common to the outputs of the phase selectors in each phase-determining circuit. Adder circuit 43 instantaneously sums the outputs of the phase selectors and, hence, provides the vectorial addition of its phase-selector outputs.

Adder circuit 43 can be a resistor that simultaneously receives the outputs of its phase selectors 41 and 42.

Circuits 41 and 42 are adjusted so that they have substantially equal-amplitude outputs. Hence, with the tone-frequency input of the respective phase-determining circuit H or K taken as a phase reference, its tone output is either 45°, 135°, 225° or 315°.

As stated above, the output of this invention provides a sequence of pulses having a single tone frequency and differing from each other by their phases. The phase during any given pulse is substantially constant.

Figure 3:
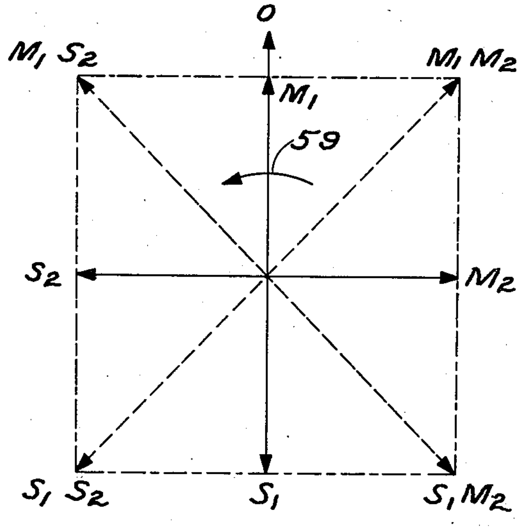
Figure 3 is a vector diagram illustrating the various phase relationships between the output tone pulses of the invention; and, Figures 4 through 18 illustrate wave forms and vector diagrams used in explaining the operation of this invention.

In order to modulate a sequence of phase-pulses with the information of two independent data channels, it is necessary to provide four possible phase conditions between adjacent tone pulses. Figure 3 illustrates the four phase conditions. Vector O represents the reference phase, which is the phase of the tone pulse immediately preceding any given tone pulse being phase measured. The phase of the given pulse is then represented in Figure 3 by any one of the four vectors $M_1M_2$, $S_1M_2$, $S_1S_2$ or $M_1S_2$, which are 45°, 135°, 225° or 315°, respectively, lagging the reference vector, if the vectors are assumed to be rotating in the direction of arrow 59.

In the operation of the invention, vector O also represents the phase of the tone input to either one of phase-determining circuits H or K, because it is received from the same output gate that provides the output pulse. Accordingly, vectors $M_1$ and $S_1$ represent the output of each 0° or 180° phase selector 41 in response to a respective mark or space input from channel one. Similarly, vectors $M_2$ and $S_2$ represent the outputs of each 90° or 270° phase selector 42 in response to a respective mark or space input from channel two. It is, therefore, realized that the output of each adder circuit 43 is the vector addition shown in Figure 3 of two adjacent orthogonal vectors to provide one of the combination vectors $M_1M_2$, $S_1M_2$, $S_1S_2$ or $M_1S_2$.

An example of operation by the invention assumes that channel one provides the binary data illustrated in Figure 11, and that channel two provides simultaneously the binary data illustrated in Figure 12. Figure 6 illustrates the sequence of timing pulses provided to terminal 31 simultaneously with the data shown in Figures 11 and 12 provided at terminals 51 and 52. A timing pulse occurs upon the introduction of each data pulse.

Figure 13:
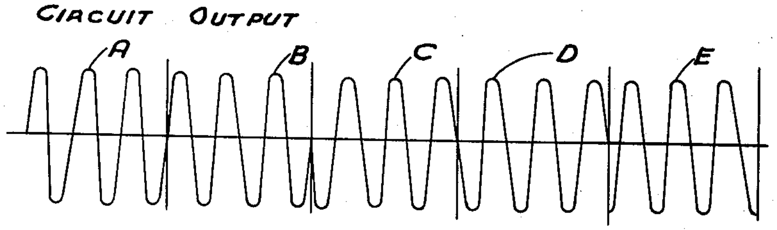

Figure 13 illustrates the sequence of phase-pulses provided at output terminal 32 with the input data of Figures 11 and 12.

Figure 4:
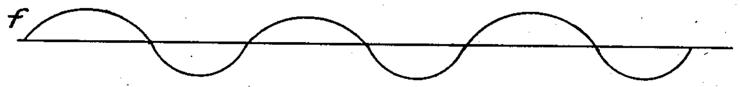
Figure 5:
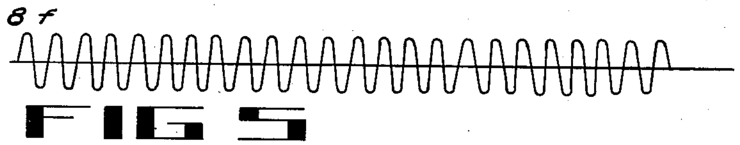

Each of the locking oscillators 11*p* and 11*q* oscillates at one-eighth of the frequency of standard source 10, to which its eighth multiple is locked frequency and phase-wise by its respective automatic-phase-control circuit. See Figures 4 and 5. It can be seen that the ×8 reference-frequency wave in Figure 15 moves through 360° in the time that the locking-oscillator wave in Figure 4 moves through 45°. Phase-wise, each locking oscillator is locked at one of eight phase positions that are integer multiples of 45°. This occurs because any one of its multiplied eight cycles per locking-oscillator cycle can phase lock with the reference source, since phase detector 13 cannot differentiate between the eight different cycles provided during each locking-oscillator cycle. Its automatic-phase-control circuit pulls the locking oscillator into phase lock by adjusting its frequency and phase through controlled-reactance 19. The locking-oscillator frequency does not have to move more than 22½° to lock with a ×8 cycle of the reference source, since 22½° of movement of the locking-oscillator frequency is equivalent to 180° of movement for its ×8 multiplied frequency. This relationship is seen by comparing the waves shown in Figures 4 and 5.

Figure 15:
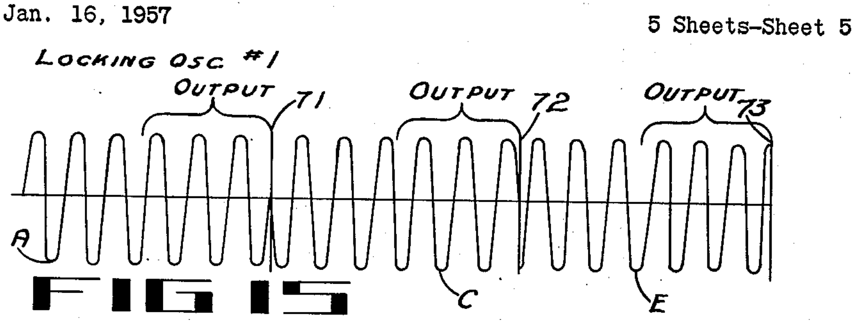
Figure 16:
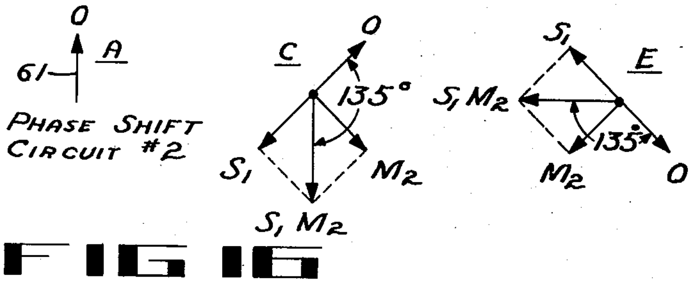

At a given time, first-locking oscillator 11*p* oscillates with a phase that can be represented by vector 61 in Figure 16, which provides wave portion A in Figure 15 up to vertical line 71. Figure 15 represents the phase sequence at the output of first-locking oscillator 11*p*.

The output of oscillator 11*p* is periodically passed through first output gate 21 during bistable-circuit pulse durations $g_1$ in Figure 7. While output gate 21 is open, phase pulse A is being provided at output terminal 32, as shown in Figure 13.

During the period that first-output gate 21 is open (output gate 22 is then closed), the frequency of first-locking oscillator 11*p* is also the tone input 46 of first phase-determining circuit H.

The first data pulses illustrated in Figures 11 and 12 for the respective channels are mark pulses, which are respectively provided at input terminals 51 and 52. Therefore, channel-one phase selector 42*h* provides 0° phase output, and channel-two phase selector 42*k* provides a 90° phase output. These phases are shown by vectors 61 and 62 in Figure 17B. Thus, first adder circuit 43*h* sums these vectors to provide 45° vector output $M_1M_2$ shown in Figure 17B, which is wave form B in Figure 18 between vertical lines 80 and 81. In Figure 1, this phase is output 47 of first phase-determining circuit H, and it is the input to second-locking oscillator 11*q*. Figure 18 illustrates the phase sequence at the output of second-locking oscillator 11*q*.

At the occurrence of the next timing pulse, a short disabling pulse is received by phase gate 17*q* from second-pulse circuit 37 to disable the automatic-phase control circuit in phase-locking circuit Q. During this disabled period, second-locking oscillator 11*q* is only controlled by the tone frequency output received from phase-determining circuit H; and accordingly, oscillator 11*q* tends to pull into phase lock with it. Oscillator 11*q* need not be precisely phase-locked with its input; as long as it is within plus-or-minus 22½° of the received frequency, so that it can select the required 45° phase multiple caused by the ×8 multiplication.

After the termination of the relatively short disabling pulse, the operation of the automatic-phase-control circuit is restored, and it brings the ×8 output frequency of the second locking oscillator into phase-lock with the nearest cycle of standard-source frequency. After phase-lock, the frequency of oscillator 11*q* is locked at substantially the same phase as the output of first phase-determining circuit H. However, the locked output phase of oscillator 11*q* has a higher order of accuracy than the output phase of circuit H; because oscillator 11*q* is referenced to a 45° point determined by the stable source frequency, while the output of circuit H may have a phase error due to lack of amplitude equality of its phase-selector outputs.

While the output phase of either phase-locking circuit is being determined and stabilized, it is not affecting the phase-pulsed output of the invention, because its output gate 21 or 22 is closed during that period. Therefore, during the phase determination period of phase-locking circuit Q, its output gate 22 is closed, as is seen by the timing of the gating wave in Figure 9.

After the next timing pulse, the output of bistable circuit 28 inverts to provide pulse $g_2$ in Figure 9 at output 26 of bistable circuit 28. This opens first output gate 21 and closes second output gate 22 to permit the phase determined and stabilized output of second-locking oscillator 11*q* to reach output terminal 32 to provide an output tone pulse having phase $M_1M_2$, which is the output part of wave B in Figure 18, and is output phase pulse B in Figure 13.

Also, the output part of wave B is the input received by second phase-determining circuit K. Simultaneously with the initiating timing pulse, the second data pulses illustrated in Figures 11 and 12 as $S_1$ and $M_2$, respectively, are received by the phase selectors in circuit K. Then, selector 41*h* provides 180° and selector 42*h* provides 270° of respective phase shifts of their received frequency. Accordingly, second adder 43*k* provides the vectorial addition shown in Figure 15C to provide output phase $S_1M_2$, also illustrated as wave C in Figure 15. This is output 49 from second phase-determining circuit K which is provided as the input to first locking-oscillator 11*p*.

Furthermore, at the instant that second-output gate 22 is opened to provide an output, a disabling pulse (shown in Figure 10) occurs from first-pulse circuit 36 to phase gate 17*p* to disable the automatic-phase control in circuit P. Oscillator 11*p* then closely aligns phase-wise with the output of second phase-determining circuit K. After the disabling pulse terminates, the automatic-phase-control circuit takes over, and the ×8 frequency of oscillator 11*p* phase-locks the closest cycle of reference frequency, as explained above, to provide a precise phase that is substantially the same as the output phase of circuit K. Thus, locking oscillator 11*p* begins period C of oscillation shown in Figure 15.

After the next timing pulse, the bistable-circuit outputs invert to close second output gate and open first output gate to provide phase-pulse C in Figure 13.

It is, therefore, seen how the tone frequency recirculates internally about a closed loop from first phase-locking circuit P through first phase-determining circuit H, second phase-locking circuit Q, and second phase-determining circuit K, back to first phase-locking circuit P to begin another recirculation cycle.

Figure 17:
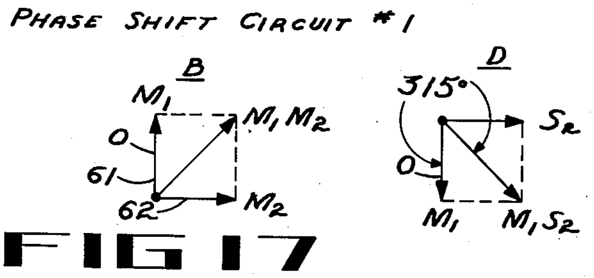
Figure 18:
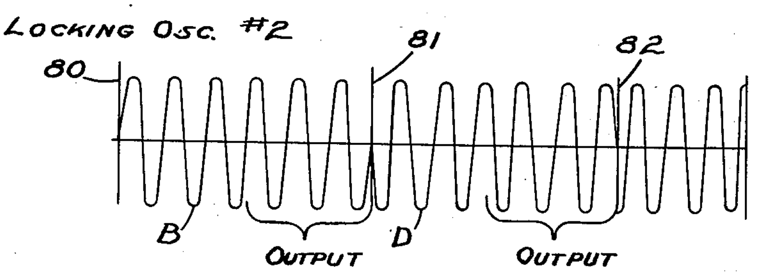

As the tone recirculates and the data of the remaining input pulses shown in Figures 11 and 12 is provided, remaining output tone pulses D and E in Figure 13 are provided and are analyzed vectorially in Figures 16E and 17D.

Figure 14:
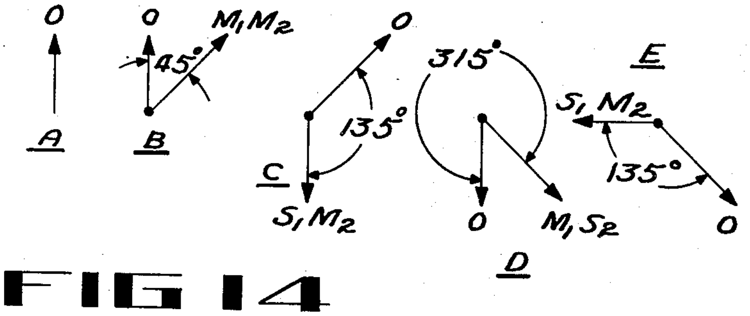

It is hence seen how the tone output of the invention is selected alternately by the output gates from the last half of each locking-oscillator steady-state period in Figures 15 and 18 to provide Figure 13. Thus, the information of two input data pulses is translated into the phase of each output tone pulse with respect to its immediate prior output pulse, as is illustrated by the vector diagrams in Figure 14 which analyze the phase modulation on the output wave of Figure 13 and relate it to the defining phases given in Figure 3.

It is, therefore, realized that the invention provides a locking-oscillator phase-pulse generator that encodes dual-channel binary information onto a single tone frequency.

Although this invention has been described with respect to a particular embodiment thereof, it is not so limited as changes and modifications may be made therein which are within the full intended scope of the invention as defined by the appended claims.

I claim:

1. A phase-pulse generator including first and second phase-locking means, first and second phase-determining-means for respectively shifting the phase of their received frequencies by an integer multiple of 90°, the outputs of said first and second phase-determining-means being connected respectively to the inputs of said first and second phase-locking means, frequency-source means for providing a stable frequency that is eight times the required output frequency of said generator, a locking-oscillator means included within each of said phase-locking means, each of said phase-locking means locking the eighth multiple of its locking-oscillator means to the frequency of said frequency-source means, first and second output gates having their inputs respectively connected to the outputs of said first and second locking-oscillator means, timing means having a pair of inverted outputs connected respectively to the control inputs of said output gates, and a pair of momentary-disabling means respectively connected between said first and second phase-locking means and the inverted outputs of said momentary-disabling circuit to alternately disable said opposite locking means, and binary-data means being connected to each of said phase-determining means to control its output phase.

2. A locking-oscillator phase-pulse generator, comprising a standard oscillator having a frequency of eight times the output frequency of said generator, a pair of phase-locking circuits; each including a locking oscillator, and an automatic-phase-controlling loop, each of said automatic-phase-controlling loops receiving the eighth-harmonic frequency of said locking oscillator and locking it with the eighth harmonic of its standard-oscillator frequency; a pair of phase-determining-circuit means for shifting an input frequency to an integer multiple of 90°, the output of each phase-determining circuit being connected to a different one of said locking oscillators, a pair of output gates having their inputs respectively connected to the outputs of said locking-oscillators, said output gates having their outputs respectively connected to the inputs of said phase-determining circuits, a bistable circuit having a pair of outputs inverted with respect to each other, the outputs of said bistable circuit being connected respectively to the control inputs of said output gates, and momentary-disabling means reversely connected between said bistable-circuit outputs and the respective automatic-phase-controlling loops to alternately disable them, and data-means for selecting the 90° integer multiple of the respective phase-determining circuits.

3. A phase-pulse generator, comprising a standard-frequency source having eight times the output frequency of said generator; first and second phase-locking circuits; each including a locking oscillator, and automatic-phase-control means for comparing and phase-locking the eighth harmonic frequency of its locking oscillator with said standard-frequency source; first and second phase-determining circuits; each including a pair of phase selectors, with one phase selector capable of phase-shifting a received frequency by 0° or 180°, and the other phase selector capable of phase-shifting the received frequency by 90° or 270°, and means for instantaneously adding the outputs of its phase selectors to provide the output of each phase-determining circuit; the output of said second phase-determining circuit being connected to the locking oscillator in said first phase-locking circuit, the output of said first phase-determining circuit being connected to the locking oscillator in said second phase-locking circuit, bistable-circuit means for providing first and second outputs inverted with respect to each other, a first output gate being connected between the locking oscillator of said first phase-locking circuit and the input to said first phase-determining circuit, a second output gate being connected between the locking oscillator of said second phase-locking circuit and input to said second phase-determining circuit, the control inputs of said first and second output gates being connected respectively to the first and second outputs of said bistable circuits, first disabling means connected between the automatic-phase-control circuit of said first phase-locking circuit and the second output of said bistable circuit means, second disabling means connected between the automatic-phase-control circuit of said second phase-locking circuit and the first output of said bistable circuit means, an output terminal connected in common to the outputs of said first and second output gates, and data means for controlling the settings of said phase selectors.

4. A phase-pulse generator for encoding dual-channel information comprising first and second locking oscillators, a standard frequency source providing eight times the frequency of said locking oscillators, first and second phase-locking means for comparing and locking the standard-source frequency with the eighth multiple of said first and second locking oscillators respectively, first and second output gates heaving their inputs respectively connected to the outputs of said first and second locking oscillators, first and second channel-one phase selectors for phase-shifting their input frequencies by 0° or 180° in response to opposite types of binary data from one of said dual channels, first and second channel-two phase selectors for phase-shifting their input frequencies by 90° or 270° in response to opposite types of binary data from the other of said dual channels, first and second adder means for instantaneously adding a pair of voltage inputs, the first of said channel-one and channel-two phase selectors having their outputs connected to said first adder means and their frequency inputs connected to the output of said first output gate, the second of said channel-one and channel-two phase selectors having their outputs connected to said second adder means and their frequency inputs connected to the output of said second output gate, the first adder means having its output connected to the input of said second locking oscillator, the second adder means having its output connected to the input to said first locking oscillator, a bistable circuit having a pair of inverted outputs, timing-pulse source synchronous with the data of said channels being connected to the input of said bistable circuit, a first pulse circuit connected between one output of said bistable circuit and the first phase-locking means to periodically disable it, a second pulse circuit connected between the other output of said bistable circuit and the second phase-locking means to periodically disable it, the control inputs to said output gates being connected oppositely to the outputs of said bistable circuit, and an output terminal of said generator being connected in common to the outputs of said first and second output gates.

5. A phase-pulse generator for modulating a single frequency in response to binary data from first and second channels, comprising a first input terminal for receiving data from said first channel, a second input terminal for receiving data from said second channel, a standard-frequency source, first and second phase-locking circuits; each comprising a locking oscillator having a free-running frequency approximately one-eighth of said standard frequency, a $\times 8$ frequency multiplier connected to the output of said locking oscillator, a phase detector having one input connected to the output of said multiplier and another input connected to said standard-frequency source, a controlled reactance associated with said locking oscillator to control its frequency and phase, a phase gate connected between the output of said phase detector and the input of said controlled reactance to normally pass said detector signal; first and second phase-determining circuits; each comprising a first-channel phase selector having its control input connected to said first channel input terminal, wherein its input frequency is phase shifted 0° or 180° in response to opposite types of binary data from said first channel, a second-channel phase selector having its control input connected to said second-channel input terminal, wherein its input frequency is phase shifted 90° or 270° in response to opposite types of binary data from said second channel, and an adder circuit connected to the outputs of said first and second channel phase seelctors; the output of the adder circuit in said first phase-determining circuit being connected to said second locking oscillator, a first output gate connected between the output of said first locking oscillator and the inputs to the phase selectors in said first phase-determining circuit, a second output gate connected between the output of said second locking oscillator and the inputs to the phase selectors in said second phase-determining circuit, a terminal for receiving timing pulses synchronous with said data pulses, a bistable circuit having its input connected to said timing-pulse terminal, said bistable circuit providing first and second inverted outputs respectively connected to the control inputs to said first and second output gates, a first pulse circuit connected between said second bistable-circuit output and the phase gate in said first phase-locking circuit to momentarily open it, a second pulse circuit connected between the first bistable-circuit output and the control input to the phase gate in said second phase-locking circuit to momentarily disable it, and an output terminal connected to the outputs of both of said output gates.

6. A system as defined in claim 5 in which each of said channel-one phase selectors is a balanced modulator; and each of said channel-two phase selectors is a balanced modulator, and a 90° phase-shift circuit connected serially with it.

No references cited.